Aug. 14, 1945.  D. SEITER  2,382,509
MILLING CUTTER
Filed July 14, 1943
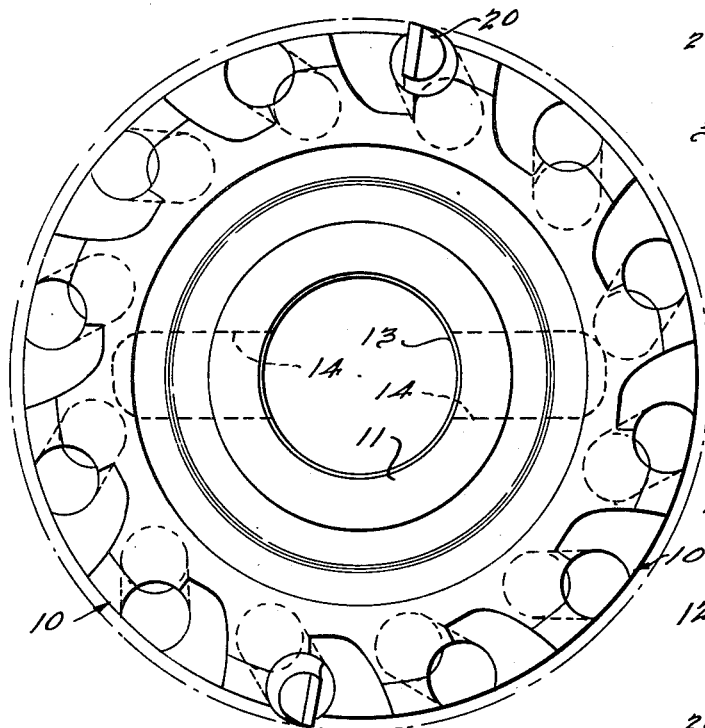
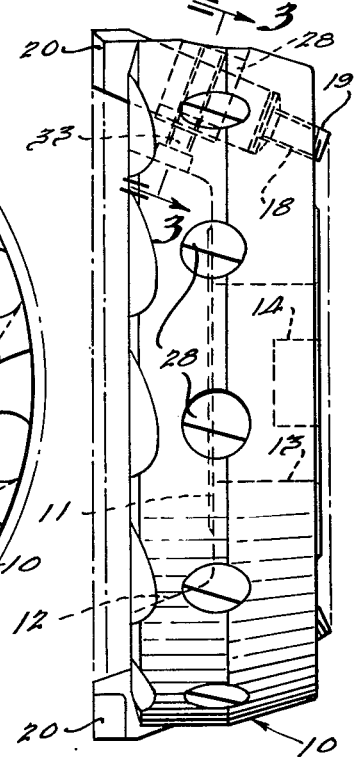
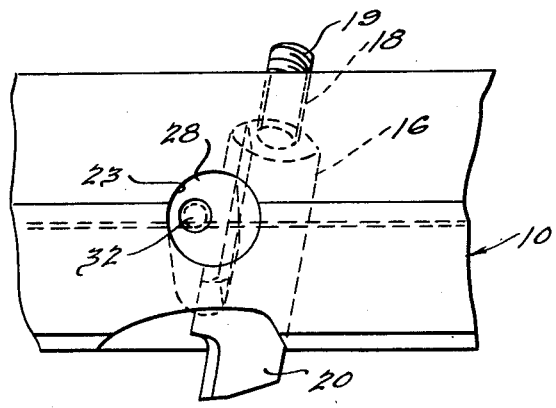
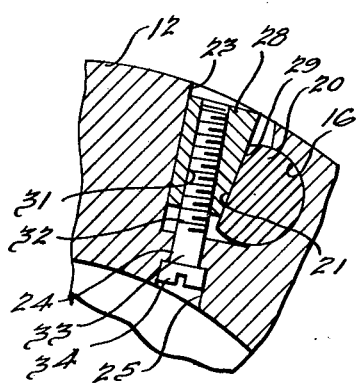
INVENTOR.
Donaldson Seiter.
BY
Harness, Dickey & Pierce
ATTY.

Patented Aug. 14, 1945

2,382,509

UNITED STATES PATENT OFFICE 2,382,509

MILLING CUTTER

Donaldson Seiter, Detroit, Mich., assignor to Tungsten Carbide Tool Company, Detroit, Mich., a corporation of Delaware Application July 14, 1943, Serial No. 494,668

1 Claim. (Cl. 29—105)

This invention relates generally to cutters, and it has particular relation to a rotary, milling cutter having insertable cutting elements.

One object of the invention is to provide a rotary cutter having insertable cutting elements, which is more economical to manufacture.

Another object of the invention is to provide an improved rotary cutter having insertable cutting elements which can be removed and/or adjusted quickly by simple manipulations while still obtaining an exceedingly rigid structure or assembly.

Another object of the invention is to provide a rotary cutter having insertable cutting elements wherein the latter are adjustably locked in openings formed by drilling or boring operations so as to simplify manufacturing, assembling and adjusting operations.

Other objects of the invention will become apparent from the following specification, from the drawing pertaining thereto, and from the claim hereafter set forth.

For a better understanding of the invention reference may be had to the accompanying drawing wherein:

Fig. 1 is an end view of a rotary cutter structure according to one form of the invention;

Fig. 2 is a side view of the cutter shown by Fig. 1;

Fig. 3 is a cross sectional view taken substantially along the line 3—3 of Fig. 2; and Fig. 4 is a plan view of the structure shown by Fig. 3.

Referring to the several figures, the cutter includes an annular body 10 having a radial wall 11 and an annular frusto-conical rim 12 projecting from the outer portion of the wall 11. At its center the wall 11 has an opening 13 for receiving a spindle, not shown, and driving engagement between the spindle and cutter may be obtained by a driving element adapted to engage recesses 14 in the wall 11.

For adjustably and removably mounting the cutting elements, a series of circumferentially spaced openings 16 are formed in the rim 12, and these extend partially into the outer portion of the wall 11. Each opening may be formed by means of a drill with the axis of the drill located in the desired angular relation to the shaft axis. At the inner end of each opening 16, the remaining portion of the wall 11 is formed with a smaller opening 18, and this opening is threaded and receives an adjusting stud 19 which is accessible at the rear side of the cutter. A cutting bar in the form of a tool bit 20 is mounted in each of the openings 16, and the body of the bit slidably but closely fits the opening 16 so as to minimize play or looseness. Along a substantial portion of the tool bit 20 the metal is removed to form a flat 21, and this flat is used to lock the bit in position, as will be presently understood.

Adjacent each of the openings 16 a second cylindrical opening 23 is formed in the rim 12, and this opening has its axis offset with respect to the axis of the opening 16 but directed in normal or right-angular relation thereto, as seen best in Fig. 2. This opening extends from the outer surface of the rim to a point slightly past the opening 16 and may be formed by drilling and boring operations. A smaller drilled opening 24 leads from the bottom of the opening 23 and in turn joins a slightly larger opening 25 which opens to the inner surface of the rim. Adjustable locking of the tool bit in its opening 16 is effected by means of a wedge 28 closely but slidably fitting the opening 23 and which has a flat side 29 contacting the flat 21 on the tool bit. The wedge 28 has a threaded opening 31 offset slightly from the axis or center line of the wedge, and this opening receives an adjusting screw 32 having a cylindrical portion 33 slidably but closely fitting the smaller opening 24 and a head 34 located in the recess or opening 25 in the inner surface of the rim.

It will be apparent that by tightening the screw 24 the wedge is drawn inwardly into the opening 23, and this wedges the flat side 29 strongly against the flat surface 21 on the tool bit. This locks the tool bit against turning and furthermore, in conjunction with the friction between the tool bit and its opening 16, provides a strong lock for preventing axial movement of the tool bit in such opening. Additionally, the threaded stud 19 abutting the inner end of the tool bit as best seen in Fig. 2, positively prevents inward movement of the tool bit in its opening during use of the cutter.

When the screw 32 is loosened slightly, the tool bit may be withdrawn frontwardly from its opening or positioned adjustably along the opening through movement of the bit by adjustment of the stud 19. After the bit is adjustably positioned along its opening, tightening of the wedge rigidly locates the tool bit against turning, and this, in conjunction with the close fit between the body of the bit and its opening 16, provides a very rigid and sturdy structure. Assembly of the parts and adjustment thereof may be effected quickly and with minimum manipulation, and since the adjusting screws are readily accessible at the inner side of the rim and at the back side of the body respectively, such assembling and adjusting operations can be completed with little difficulty.

It will be noted particularly that the tool bit body and the wedge may be made from round bar stock, and ordinarily this is desirable, since it simplifies manufacturing operations and reduces the cost of construction. Furthermore, it should be apparent that the openings for receiving the tool bits and wedging means are cylindrical, and consequently these openings may be formed without difficulty by drilling and boring operations. In general, all the removable parts mentioned may be made from round bar stock and the openings therefore formed by simple boring or drilling operations and subsequent threading where necessary. Along with these advantages characterizing the invention, it may be repeated that a very rigid and strong tool bit mounting is attained, and this is important in milling cutters, especially where more than light cuts are taken.

While only one form of the invention has been illustrated and described, it will be apparent to those skilled in the art that various modifications may be made without departing from the spirit of the invention.

What is claimed is:

A rotary cutter comprising a rotary body having an outwardly directed wall and an annular rim at the outer edge of the wall, said rim having a cylindrical opening extending axially from its free end and partially through the wall, the wall having a threaded smaller opening extending from the end of the first opening and through the remainder of the wall, a cutter bar in the first opening and having a flat surface portion, a threaded element in the smaller opening and engaging the cutter bar for moving the latter along its opening, said rim having a second cylindrical opening extending transversely to the first opening and partially intersecting it, a wedge element having a tapped axial opening slidable in the second opening and having a wedge face contacting the wedge surface of the cutter bar, and threaded means connecting the rim and wedge element for adjusting the latter along its opening, said last-mentioned means comprising a screw threaded into the wedge element and accessible at the radially inner side of the rim for adjustment.

DONALDSON SEITER.